United States Patent [19]

Davis

[11] Patent Number: 5,325,028
[45] Date of Patent: Jun. 28, 1994

[54] SYSTEM AND METHOD FOR MAGNETIC TAPE LEADER BLOCK EXTRACTION

[75] Inventor: Bruce M. Davis, Longmont, Colo.

[73] Assignee: Storage Technology Corporation, Louisville, Colo.

[21] Appl. No.: 37,451

[22] Filed: Mar. 26, 1993

[51] Int. Cl.$^5$ ............................................. G05B 11/01
[52] U.S. Cl. ................................. 318/560; 318/567; 318/632; 318/561
[58] Field of Search ................ 318/560, 567, 632, 561

[56] References Cited

U.S. PATENT DOCUMENTS

| | | | |
|---|---|---|---|
| 4,287,461 | 9/1981 | Promis et al. | 318/561 |
| 4,429,262 | 1/1984 | Utenick | 318/632 |
| 4,925,312 | 5/1990 | Onaga et al. | 364/513 |
| 4,959,797 | 9/1990 | McIntosh | 364/508 |
| 5,107,193 | 4/1992 | Iwashita | 318/560 |
| 5,196,774 | 3/1993 | Baciak et al. | 318/560 |
| 5,210,476 | 5/1993 | Kazato | 318/560 |

*Primary Examiner*—William M. Shoop, Jr.
*Assistant Examiner*—Karen Masih
*Attorney, Agent, or Firm*—Sterne, Kessler, Goldstein & Fox

[57] ABSTRACT

A system and method for controlling an amount of force supplied by a motor to move an object from an at-rest position is presented. The system comprises a motor controller configured to provide a motor control signal to control the amount of force supplied by the motor, and a position sensor configured to detect an actual position of the object being moved by the motor and to send an actual position signal to the motor controller. The motor control signal supplied by the motor controller controls the motor such that the motor supplies a cubic increase in force on the object to move the object from its at-rest position. The motor controller comprises a profile generator, configured to provide an acceleration profile, a velocity profile and a position profile, and to output a drive signal in response to the position profile, wherein the position profile represents a desired position of the object as a function of time. The position profile is a cubic profile as a function of time. The motor controller further comprises a summer to generate an error signal based on the difference between the desired position and the actual position. The motor controller also includes a compensator to generate the motor control signal in response to the error signal.

17 Claims, 10 Drawing Sheets

SYSTEM AND METHOD FOR MAGNETIC TAPE LEADER BLOCK EXTRACTION

BACKGROUND OF THE INVENTION

1. Field of the Invention

The present invention relates generally to motor controllers, and more specifically to a motor controller for controlling the amount of force applied by a motor to move an object from an at-rest position.

2. Related All

Magnetic tape drives are commonplace in today's computer industry. These tape drives are used to store digital information onto magnetic tapes and to subsequently read the stored information. Two examples of a magnetic tape drive are the IBM 3480 tape drive available from International Business Machines in Armonk, N.Y. and the StorageTek 4480 tape drive available from Storage Technology Corporation in Louisville, Colo.

Magnetic tapes are typically available in two common formats: the cassette and the cartridge. The cassette tape is a two-reel mechanism that includes a supply reel and a take-up reel. Cassette tape drives thread the magnetic tape along a transport path, past one or more magnetic transducer heads, and then transport the tape such that it travels along the transport path. The tape is taken from the supply reel and wound onto the take-up reel. For tape drives capable of operating in a forward and reverse direction, the take-up reel and the supply reel exchange functions when the direction For cartridge tapes, the take-up reel is external to the tape cartridge and is typically provided internal to the tape drive. When a cartridge is inserted into a tape drive, it is threaded along the transport path. The threading is accomplished as follows: an extractor arm "grasps" a leader block at the free end of the tape. The extractor arm pulls the tape by the leader block along the transport path past one or more transducer heads, idler arms, capstans, and the like. The tape is then fastened around the take-up reel. Once this is accomplished, the tape can be transported along the transport path and read/write operations can take place. A thread motor is used to drive the extractor arm. Depending on the tape drive utilized, the tape transport path may be an irregular path.

Thus, leader block transport can be discussed in terms of three phases. First is the initial phase of leader block extraction during which the leader block is pulled from an at-rest position such that the tape begins to spool from the supply reel. Second is the threading phase, during which the tape is threaded along the transport path. Finally, there is the transport phase, during which the tape is moved along the transport path across the tape heads.

Conventional tape transport systems are implemented such that the leader block is extracted by applying a pulse of current to the thread motor sufficient to overcome the static forces of friction. This pulse of current results in a constant acceleration profile versus time. The inventor has discovered that this conventional method "jerks" the leader block from the cartridge, thereby causing violent reactions in the tape. Problems encountered include stretched and ripped tape, tape oscillations resulting in normal forces along the tape, and tape overshoot.

What is needed is a tape threading mechanism that does not "jerk" the tape out of the cartridge housing during the extraction phase, but instead provides a smooth extraction. However, an additional challenge is that this smooth extraction must be performed in such a manner as to optimize the time required to thread the tape. Faster threading times reduce latencies associated with access to data stored on tape cartridges.

SUMMARY OF THE INVENTION

The present invention provides a system and method for achieving tape leader block extraction in a manner that reduces forces on the tape and prolongs tape life. The present invention accomplishes this goal while optimizing the amount of time it takes to complete a threading operation.

A motor control system is implemented to provide a gentle acceleration profile. The motor controller uses a ramp acceleration profile, a parabolic velocity profile, and a cubic position profile. The cubic position profile is compared with an actual position to determine an error level. The error level is filtered through a compensator, the output of which is used to drive a thread motor.

A certain amount of force, called the "breakover" force is required to extract the leader block from the tape cartridge. Before breakover force is exceeded, a position signal representing the actual position of the thread arm remains at zero. Thus, the error signal mirrors the position profile generated by the motor controller. As a result, the force exerted by the thread motor increases as a cubic up until the breakover point.

Once the breakover force is exceeded, the leader block is extracted and the thread arm begins to move. Now, the error signal is a linear signal. Once the leader block is extracted, the acceleration can be controlled in a step-wise fashion to ramp the velocity up or down depending on the actual velocity required at various positions along the transport path.

Because the initial force supplied to the motor to meet the breakover force is a cubic profile, the leader block is not jerked out of the tape as harshly as if the acceleration profile was a pulse and the velocity was a ramp. This provides a gentler tape handling and serves to increase the useful life of the tape.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

1. Overview and Discussion of the Invention

The present invention is directed to a system for providing a gentle tape leader block extraction to reduce forces on the tape and prolong tape life. The invention accomplishes this while optimizing the amount of time it takes to complete a threading operation. The invention can be applied to the more general case of using a motor to move any object from an at-rest position.

The invention provides a processor-controlled motor controller that controls the amount of current (or voltage) supplied to a drive motor, such that the motor acceleration profile versus time is, at worst case, a ramp versus time profile. This is in contrast to conventional systems that provide a pulse or step-wise acceleration profile.

Figure 1A:
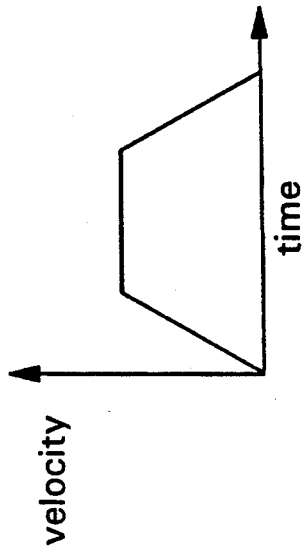
FIG. 1A illustrates a triangular velocity profile used to move an object a given distance in a fixed time t.
Figure 1B:
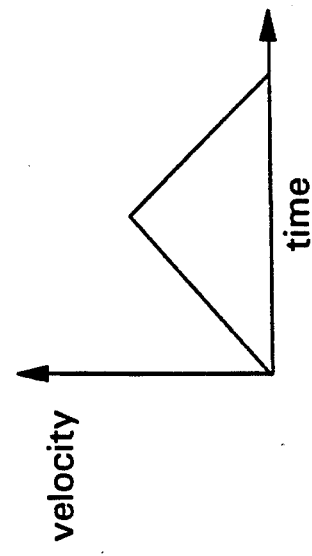
FIG. 1B illustrates a trapezoidal velocity profile used to move an object a given distance in a fixed time t.

One conventional technique for moving an object over a long distance involves following a triangular or trapezoidal velocity profile versus time. Such velocity profiles are illustrated in FIGS. 1A and 1B. FIG. 1A is a triangular profile and FIG. 1B is a trapezoidal profile. For a given constant acceleration, the triangular profile transports the object to its destination in the shortest amount of time. For a constant acceleration and a case where maximum velocity is reached, the trapezoidal profile transports the object in the shortest amount of time. These types of velocity profiles are attained by using a constant acceleration versus time as illustrated, respectively, in FIGS. 1C and 1D.

There are two widely used techniques of achieving the constant acceleration profile. These two techniques are used to control the movement of objects over distances in numerous applications from tape leader blocks to elevators. One such technique involves solving dynamic equations of motion for a mass or inertia and expressing the velocity as a square root of the remaining move distance and the acceleration, as illustrated in Equation 1.

$$\sqrt{acceleration * distance} = velocity \qquad (1)$$

The velocity computed in Equation (1) is then input to a velocity control system, thus achieving the triangular or trapezoidal velocity profiles of FIGS. 1A and 1B, respectively. This method is frequently used to move objects through a distance, especially where time is a critical factor.

A second technique uses a linear position control system. With this technique, a parabolic position profile versus time is input to a linear position controller. If the controller has sufficient bandwidth to follow the input with high fidelity, the velocity will be triangular or trapezoidal. Consequently, the acceleration will be constant versus time.

Figure 1C:
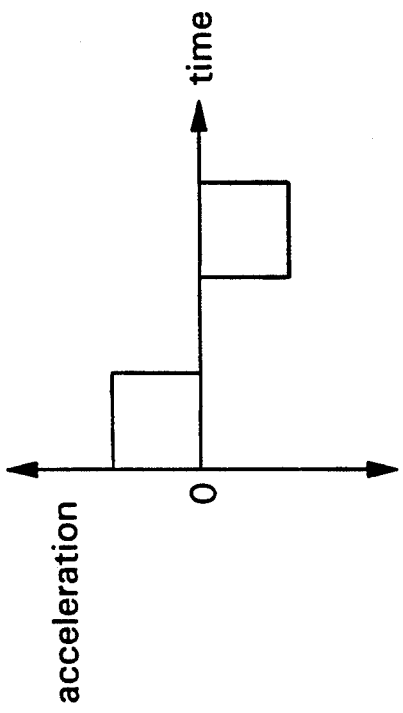
FIG. 1C illustrates a step-wise, or pulse, acceleration profile used to obtain the velocity profile of FIG. 1A.
Figure 1D:
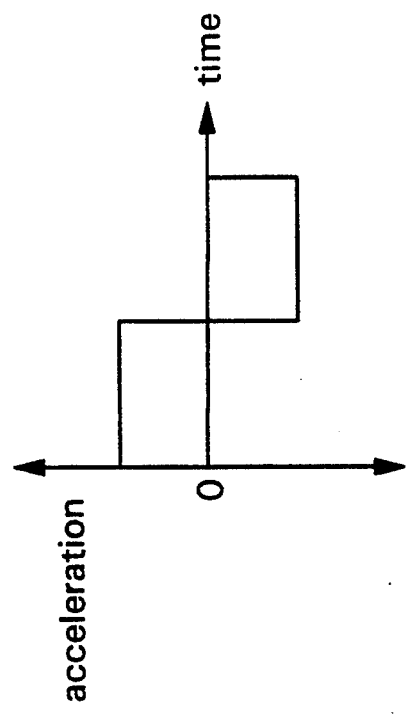
FIG. 1D is a step-wise, or pulse, acceleration profile used to obtain the velocity profile illustrated in FIG. 1B.

Both of these techniques use a constant acceleration as illustrated in FIGS. 1C and 1D. This implies either a parabolic increase in current or a pulse of current to the drive motor to achieve the breakover force. This type of current increase can lead to violent leader block extraction. The inventor has discovered that this results in a number of potential problems such as a higher probability of tape damage, tape stretch, and tape overshoot. The pulse of current is also a problem for other applications as well because the resultant acceleration profile leads to "jerky" motions.

The problem of leader block extraction is not easily solved when it is critical that the object be transported to its destination in the shortest amount of time possible. Decreasing the rate of acceleration would simply decrease the slope of the velocity curve, thus increasing the amount of time required to transport the object to its destination.

To solve the problem of violent leader block extraction, a microprocessor-based control system is used to replace the pulse type of acceleration found in conventional systems. The invention guarantees, at worst, a ramp profile versus time for the acceleration during the leader block extraction period. This results in a gentler increase in force (torque) versus time which leads to a gentler leader block extraction. As a result, the thread motor gradually pulls on the leader block until it breaks free from the at-rest position. The invention is implemented such that the amount of time required to extract the leader block is optimized. Thus, the gradual application of force does not adversely impact associated system latencies.

2. Example Implementation

Figure 2:
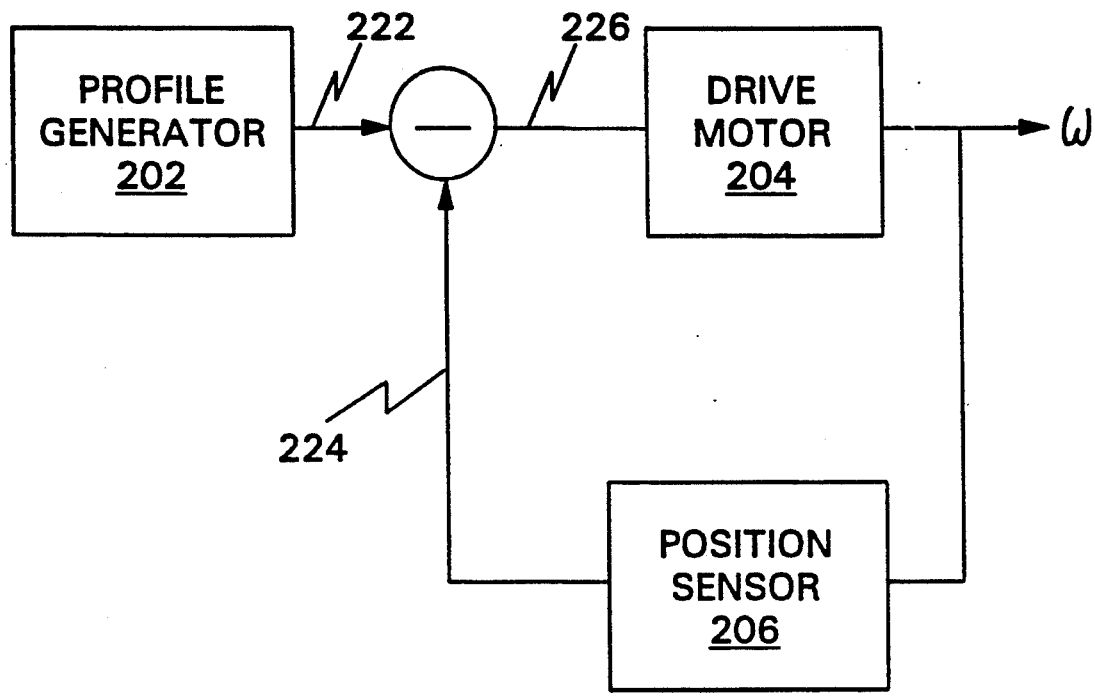
FIG. 2 is a block diagram illustrating a basic motor control system according to the present invention.

The invention can be implemented using a profile generator feeding a motor, and a feedback loop to indicate position or displacement. FIG. 2 is a block diagram illustrating a motor control system according to the present invention. The invention can be used to control the acceleration, velocity and position of any of a number of devices such as the tape drive thread arm, a robotic arm, an elevator, and the like. The invention will be described in terms of controlling a tape drive thread arm.

Referring now to FIG. 2, a profile generator 202 is implemented to generate profiles for acceleration, velocity and displacement of the thread arm over a period of time. According to a preferred embodiment, the profiles are generated using the following (digital integrate) recursion formulae:

(a) $Refaccel_n = Refaccel_{n-1} + Rate$ \qquad (2)

(b) $Refvel_n = Refvel_{n-1} + Refaccel_n$

-continued (c) $Refpos_n = Refpos_{n-1} + Refvel_n$

In Equations (2)(a) through (2)(c), n represents an iteration number in discrete time and Rate is a variable selected to obtain the desired profile. Equation (2)(a) develops the acceleration profile $Refaccel_n$, Equation (2)(b) develops the velocity profile $Refvel_n$, and Equation (2)(c) develops the position (or displacement) profile $Refpos_n$. A position can also be discussed in terms of a phase or an angular displacement of a motor shaft.

$Refaccel_n$, is equal to its previous value $Refaccel_{n-1}$, (at the previous iteration n-1) plus the variable Rate. Thus if Rate is a constant value and the iteration interval time remains constant, $Refaccel_n(t)$ (i.e., $Refaccel_n$ as a function of time) changes linearly. In other words, in this case $Refaccel_n(t)$ has a ramp profile where its shape is a function of the value of Rate.

Profile generator 202 supplies a drive signal 222 to drive motor 204, which is a thread motor in this specific example. Presence of drive signal 222 results in an angular velocity $\omega$ of a shaft of motor 204. Velocity w is zero until there is enough current at drive motor 204 to overcome static forces (e.g., friction). For the case of the thread arm, velocity $\omega$ is zero until there is a sufficient amount of current to provide the torque necessary to begin pulling the leader block from the at-rest position.

A position sensor 206 is used to determine the actual displacement of the thread arm and provides a displacement signal 224 representing the actual displacement. Position sensor 206 can be implemented using a variety of different techniques. For example, one technique would be to use a position encoder on the shaft and a counter to determine the actual displacement. Another example technique would be to sense the actual position of the thread arm using sensors along the transport path.

Displacement signal 224 may be scaled or otherwise manipulated to coincide with other system parameters. Displacement signal 224 is subtracted from drive signal 222 to create a corrected drive signal 226. It is corrected drive signal 226 that actually determines the current into motor 204.

Figure 3A:
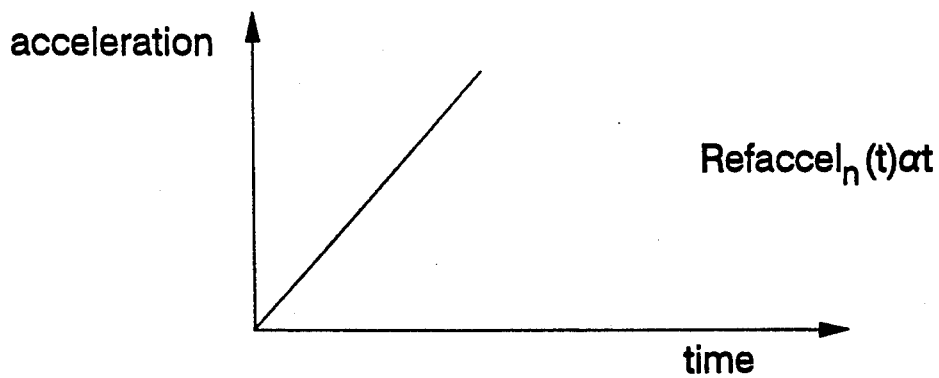
FIG. 3A shows a linear acceleration profile as a function of time.

To achieve desired acceleration, velocity and displacement profiles, profile generator 202 controls the variable Rate. As described above, if Rate is a constant variable, $Refaccel_n(t)$ increases or decreases linearly. Thus, for a constant Rate, the acceleration profile is a straight-line ramp with a positive or a negative slope. The slope is related to the magnitude of Rate and the iteration period. For a constant value of Rate, the acceleration profile is illustrated in FIG. 3A.

Figure 3B:
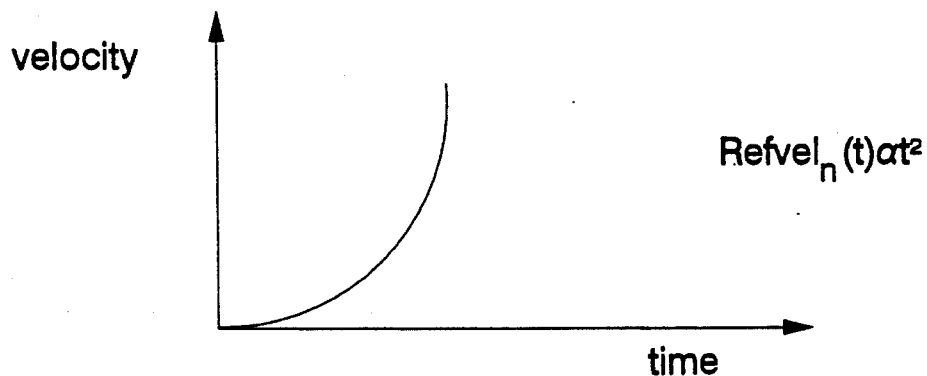
FIG. 3B illustrates a parabolic velocity profile as a function of time.

In this case, the resultant velocity $\omega$ is simply the integral of the acceleration (see Equation 2 (a)). Thus, for a constant value Rate, the velocity increases as a square of time (specifically, as a function of the square of the integration period). This is illustrated in FIG. 3B. In this case $Refvel_n(t) \alpha t^2$.

Figure 3C:
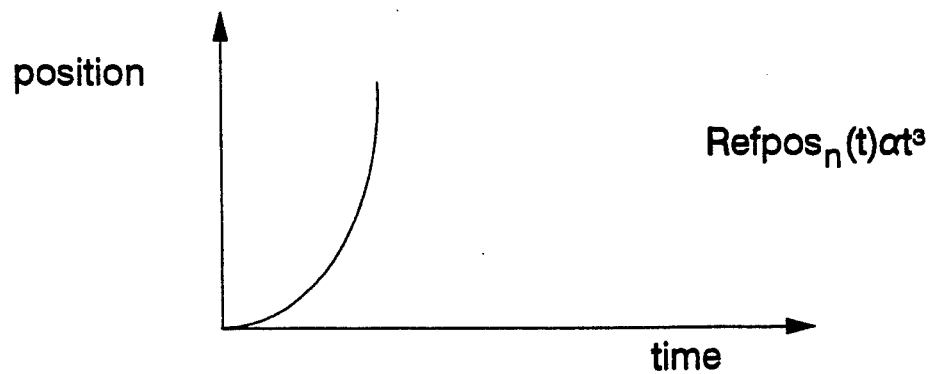
FIG. 3C illustrates a cubic position profile as a function of time.

The position, $Refpos_n$, is the integral of the velocity. Thus, the position of the thread arm as a function of time, $Refpos_n(t)$, is a cubic signal when the variable Rate is held constant (more specifically, it is a function of the cube of the integration period). This is illustrated in FIG. 3C. In this case $Refpos_n(t) \alpha t^3$.

Drive signal 222 is actually proportional to $Refpos_n$. Drive signal 222 indicates the desired position of the thread arm at a given time.

Before breakover force is exceeded, displacement signal 224 is zero because the thread arm has not yet moved and corrected drive signal 226 is the same as drive signal 222. Thus, for a constant value of Rate, corrected drive signal 226 increases at a cubic rate. As a result, the amount of force applied by drive motor 204 to the thread arm increases as a cubic profile versus time.

Once the breakover force is exceeded and the thread arm begins to move, corrected drive. signal 226 is the difference between the desired position, $Refpos_n$, and the actual position. Because $Refpos_n$ and the actual position are both increasing as a cubic, corrected drive signal 226 (the difference) increases substantially linearly.

If position sensor 206 determines that the thread arm is where it should be at a given instant in time, this is indicated in displacement signal 224. Displacement signal 224 in this case is the same as drive signal 222. As a result, corrected drive signal 226 provides no additional current to accelerate drive motor 204. Enough current is provided to maintain a constant velocity without acceleration or deceleration.

Finally, if position sensor 206 determines that the thread arm is ahead of where it should be at a given instant in time, displacement signal 224 is larger than drive signal 222. In this case, corrected drive signal 226 has negative slope and decelerates drive motor 204.

3. Description of the Embodiments

Figure 4:
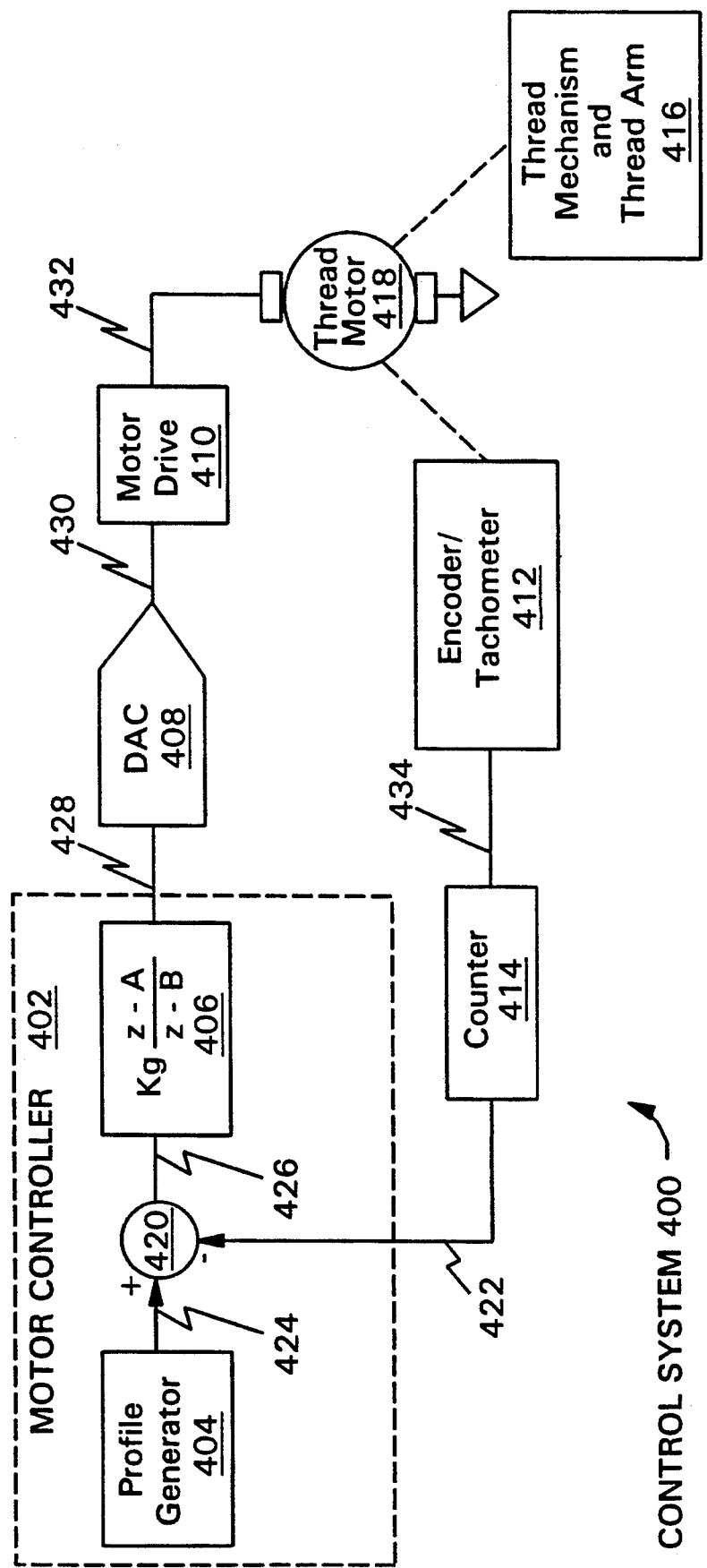
FIG. 4 is a block diagram illustrating a control system used to control the extraction and motion of a magnetic tape.

A preferred embodiment uses a microprocessor-based motor controller and displacement feedback to further control the amount of current supplied to a drive motor. FIG. 4 is a block diagram illustrating a preferred embodiment of a control system 400 according to the present invention. The preferred embodiment is illustrated as controlling a thread arm for threading a magnetic tape along a transport path. It would be apparent to a person skilled in the relevant art how the invention could be implemented to control other motor applications. For example, the invention could be used to control the motion of a general purpose robotic arm or an elevator.

Referring now to FIG. 4, a motor controller 402 is used to control (indirectly) the amount of current that is actually supplied a thread motor 418. According to a preferred embodiment, motor controller 402 is a microprocessor-based controller. Motor controller 402 comprises a profile generator 404, a compensator 406 and an input for receiving a position signal 422 (referred to as Actpos(t) 422). Motor controller 402 also has a summing junction 420.

Profile generator 404 generates the acceleration, velocity and position profiles described in Equations (2)(a) through (2)(c) and FIGS. 3A-3C.

Compensator 406 is provided to stabilize the system, provide a satisfactory transient response, and ensure that the steady-state error does not exceed a specified maximum. FIG. 4 illustrates series compensation. It would be apparent to a person skilled in the relevant art how the system could be implemented using feedback or parallel compensation or other stabilization techniques. According to a preferred embodiment, the transfer function of compensator 406 is given by Equation 4.

$$G(z) = K_G \frac{(z - A)}{(z - B)} \tag{3}$$

A digital-to-analog converter (DAC) 408 converts the output of motor controller 402 to an analog signal 430. A motor driver 410 uses analog signal 430 to drive thread motor 418 with current 432. The amount of current 432 is varied in response to analog signal 430.

In response to current 432, thread motor turns a shaft that imparts motion to thread arm 416. When the shaft rotates, position encoders 412 generate pulses 434 in response to the rotation. The pulses 434 are fed to a counter 414. Pulses 434 indicate the rotation amount (e.g., radians) of the shaft of thread motor 418.

Counter 414 counts the number of pulses 434 and correlates this number to a distance traveled by thread arm 416. Counter 414 then generates position signal Actpos(t) 422. Actpos(t) 422 can also be scaled.

Figure 5:
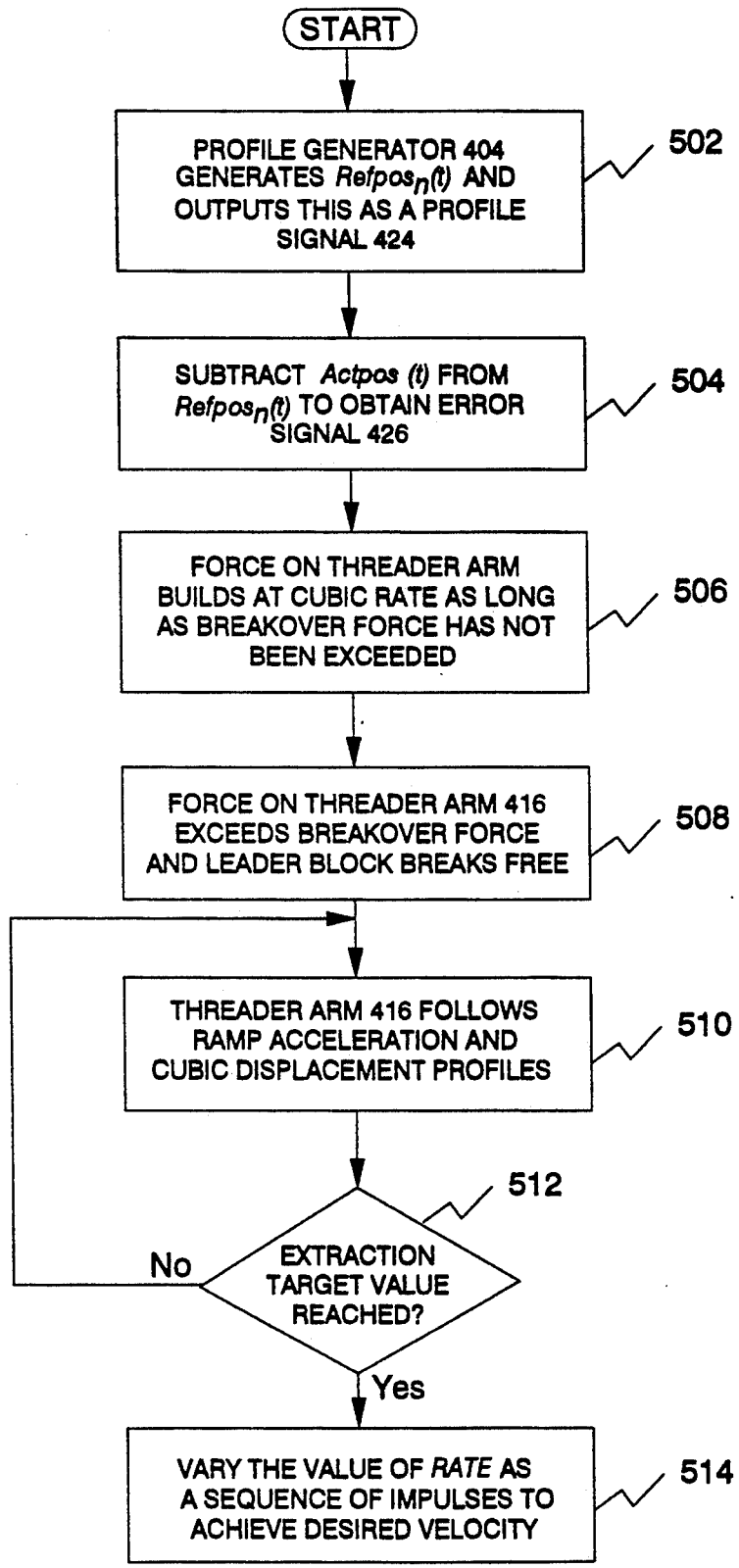
FIG. 5 is a flowchart illustrating a method of extracting a tape leader block and moving a tape along a transport path.

FIG. 5 is a flow chart illustrating the steps followed using control system 400 in a typical tape threading application. Referring now to FIGS. 4 and 5, in a step 502, at the start of a tape leader-block extraction operation, profile generator 404 generates $Refpos_n(t)$ and outputs this as profile signal 424. This signal 424 indicates the position at which thread arm 416 should be for a given time t. As noted above, $Refpos_n(t) \alpha t^3$, thus, profile signal 424 is a cubic signal (see FIG. 3C).

In a step 504, Actpos(t) is subtracted from $Refpos_n(t)$ to obtain error signal 426. Error signal 426 represents a position error that is the difference between the desired and the actual positions. As long as thread arm 416 hasn't moved (i.e., shaft of motor 418 has not rotated) Actpos(t) is zero and error signal 426 is the same as $Refpos_n(t)$. In this case, error signal 426 is also a cubic signal.

A cubic error signal 426 into compensator 406 does not cause a significant transient response on motor controller output signal 428. This results in current 432 building in thread motor 418 at a cubic rate as long as thread arm 416 has not yet moved and Actpos(t) is zero. This is illustrated by the curve in FIG. 6 between the times $t_0$ and $t_1$. Consequently, the force exerted on thread arm 416 by motor 418 is in direct proportion to error signal 426. In other words, the force on thread arm 416 builds up at a cubic rate. This is shown as occurring in a step 506.

At the beginning of the extraction phase this cubic increase in force provides gradual increase in force than would a pulse of current resulting in an immediate application of force sufficient to extract the leader block. The result of a cubic increase is a very smooth yet rapid transition from not moving to moving. This smooth transition can be visualized by noting the smoothness of the increase in force from $t_0$ to $t_1$ in FIG. 6.

In a step 508, at a time $t_1$, thread motor 418 has enough current ($i_1$) to produce enough force to extract thread arm 416. In other words, the force exerted on the leader block exceeds the breakover force of the leader block.

Once the leader block breaks free of the cartridge (i.e., once the thread arm begins moving), the arm follows the cubic displacement and ramp acceleration profiles until $Refpos_n(t)$ reaches a specified extraction target value. This is illustrated by decision block 510 and step 512.

Figure 6:
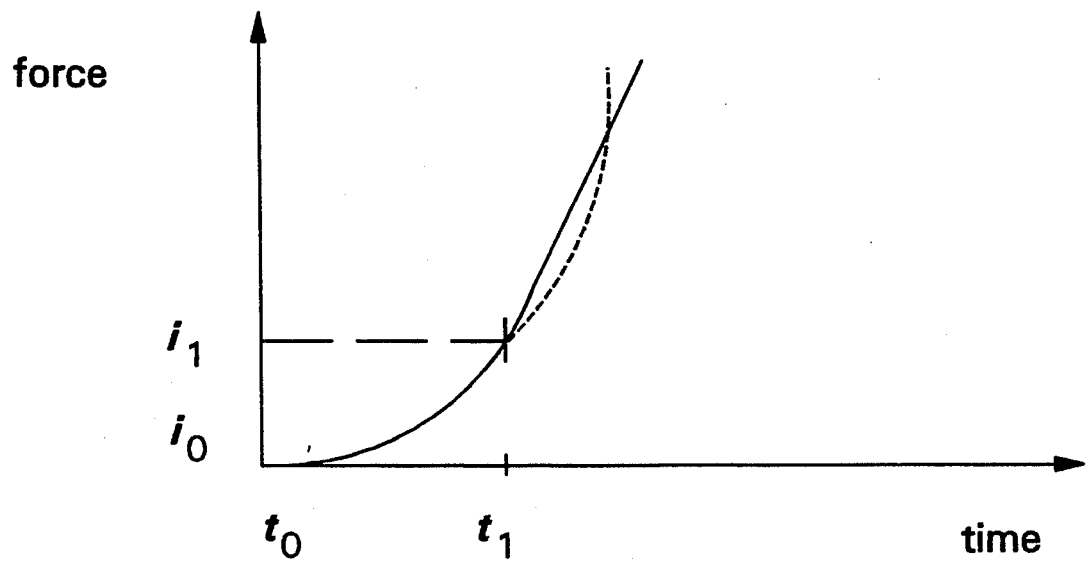
FIG. 6 is a diagram illustrating force exerted by a drive motor according to the present invention.

When thread arm 416 is moving, counter 414 is counting pulses of encoder 412 and generating a non-zero Actpos(t) 422 in a step 512. This results in an error signal 426 having essentially a ramp profile versus time, and ultimately a linear increase in the force of thread motor 418. This is illustrated in FIG. 6 at times after $t_1$.

Once the extraction target value is reached, the variable value of Rate is varied as a sequence of impulses to achieve the desired velocity. This results in a pulse type of acceleration profile and a ramp velocity profile. If Rate is zero, the acceleration is constant from one iteration to the next. This is illustrated by a step 514. This is useful for maintaining velocity at an optimum rate as thread arm 416 pulls the leader block along an irregular transport path.

Figure 7:
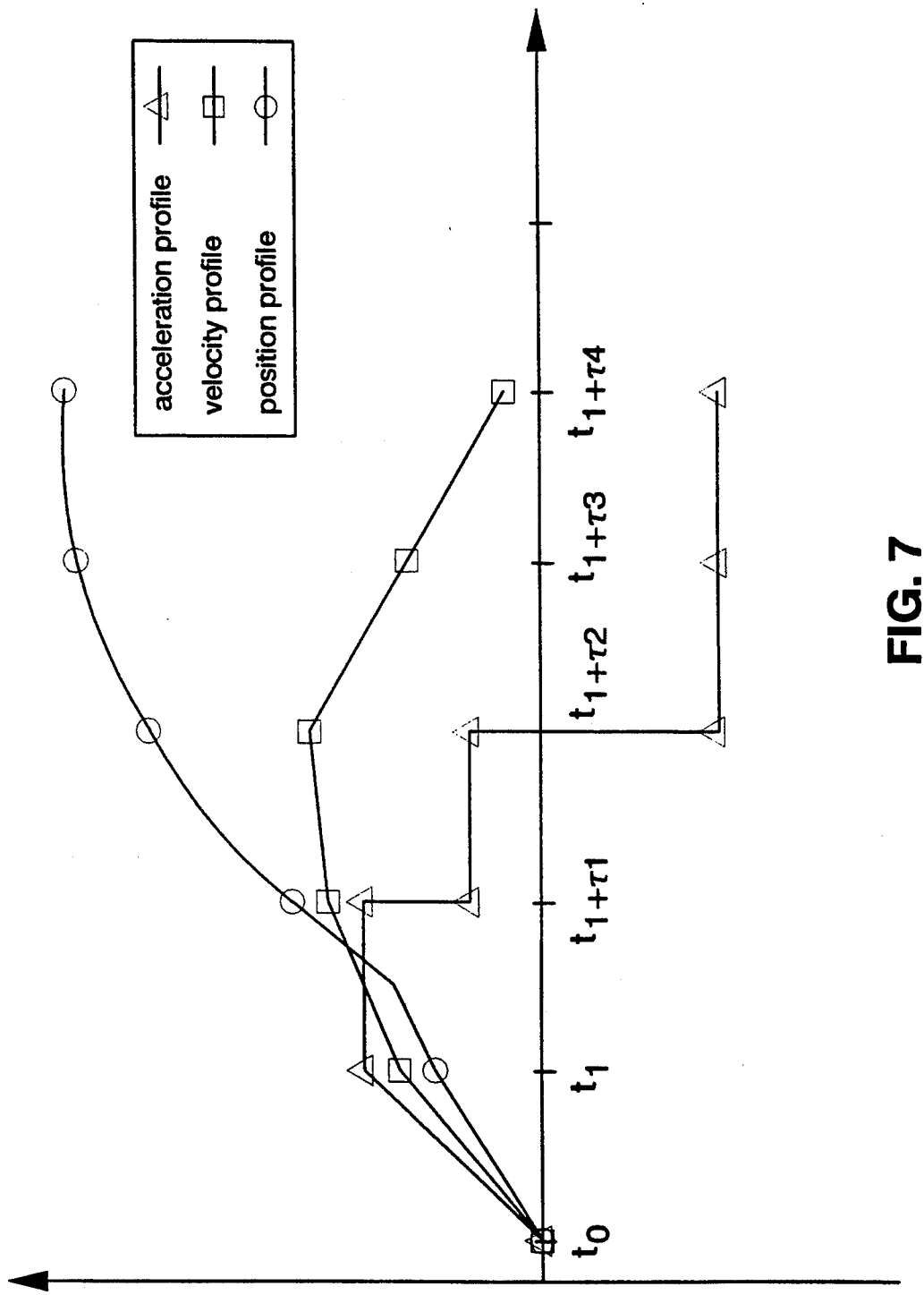
FIG. 7 illustrates the relationship between an acceleration profile and a velocity profile and a position profile.

FIG. 7 is used to illustrate the relationship between the acceleration profile, the velocity profile, and the position profile at various times throughout the leader block extraction process. From a time $t_0$ to $t_1$, the acceleration profile is a ramp profile (see equation 2). Because during this time the leader block has not yet been extracted, position signal 422 is zero and thread arm 416 is at its initial position. Thread arm 416 has not yet moved. Therefore, the curves plotted on FIG. 7 between the times $t_0$ and $t_1$ illustrate the acceleration demand, velocity demand, and position demand. As described above with respect to FIGS. 4 and 5, during the time $t_0$ to $t_1$, error signal 426 is a cubic signal, and hence, the force exerted by thread motor 418 increases as the cube of time.

At time $t_1$, the break-over force of the leader block is exceeded, and thread arm 416 is moved by thread motor 418. As mentioned above, this may be allowed to continue up until $Refpos_n(t)$ variable reaches an extraction target value. The extraction target value represents an amount of force known to be sufficient to extract the leader block. To maintain simplicity of FIG. 7 and this discussion, this value will be assumed to occur at $t_1$. After time $t_1$, the acceleration is adjusted in a step-wise manner such that the acceleration is constant, the velocity increases or decreases linearly with time, and the position profile is proportional to the square of the time. In FIG. 7, it is illustrated that the acceleration remains constant at its value at time $t_1$.

The acceleration can be increased or decreased in a step-wise fashion. For example, at time $t_{1+r1}$ the level of acceleration is decreased to a smaller constant value. During the time $t_{1+r1}$ to $t_{1+r2}$, because the amount of acceleration is smaller, the rate of increase in velocity is smaller and the rate of change of the position of thread arm 416 is also smaller.

As another example, consider what happens at time $t_{1+r2}$ when the acceleration is decreased to a negative value. During the period of negative acceleration, from time $t_{1+r2}$ to time $t_{1+r4}$, the velocity decreases linearly. The slope of the velocity profile is related to the magnitude of the acceleration.

The magnitude and sign of the acceleration can be chosen to match desired velocity and position profiles depending on the transport path.

Figure 8:
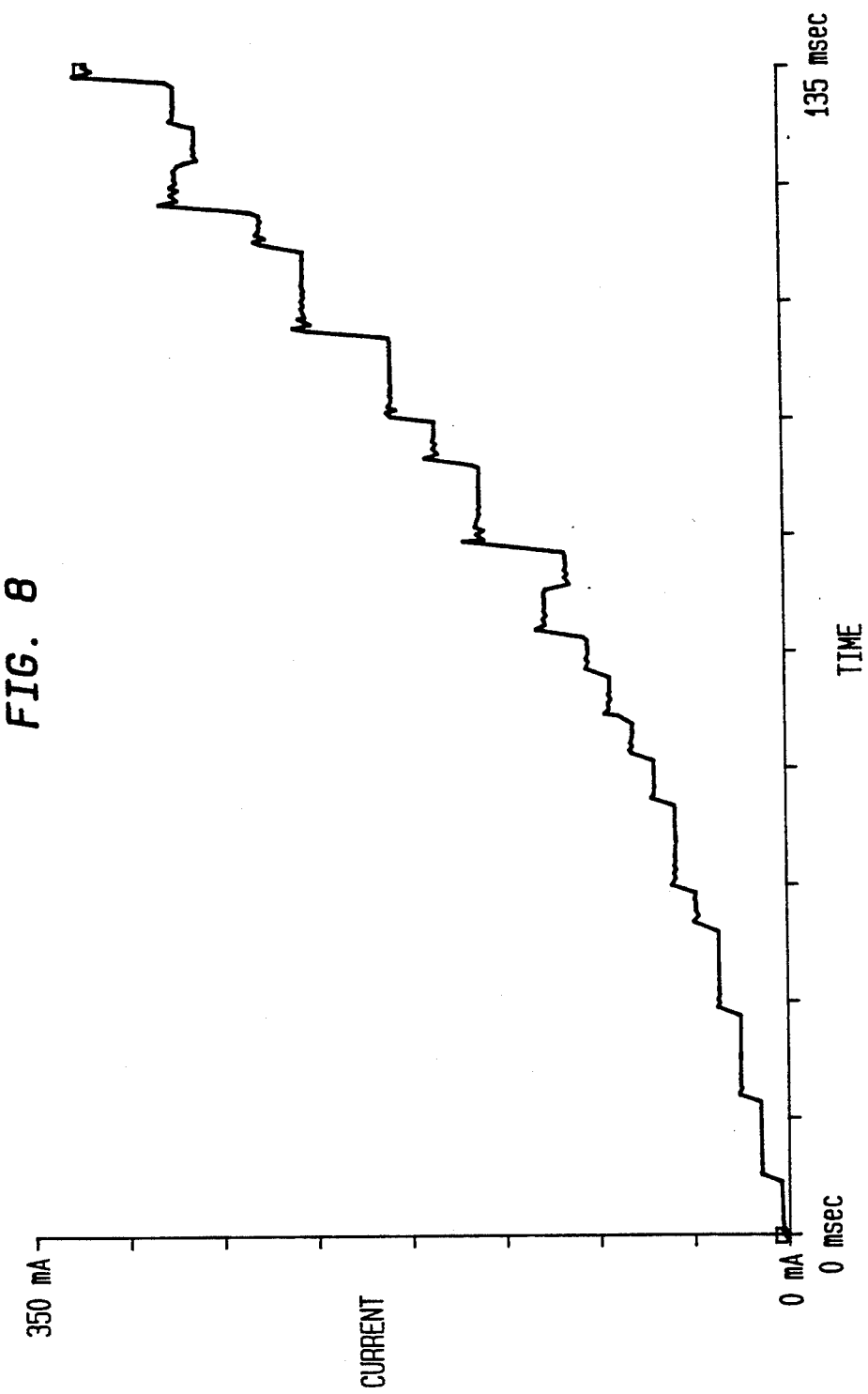
FIG. 8 is a plot showing motor current vs. time for an actual control system.
Figure 9:
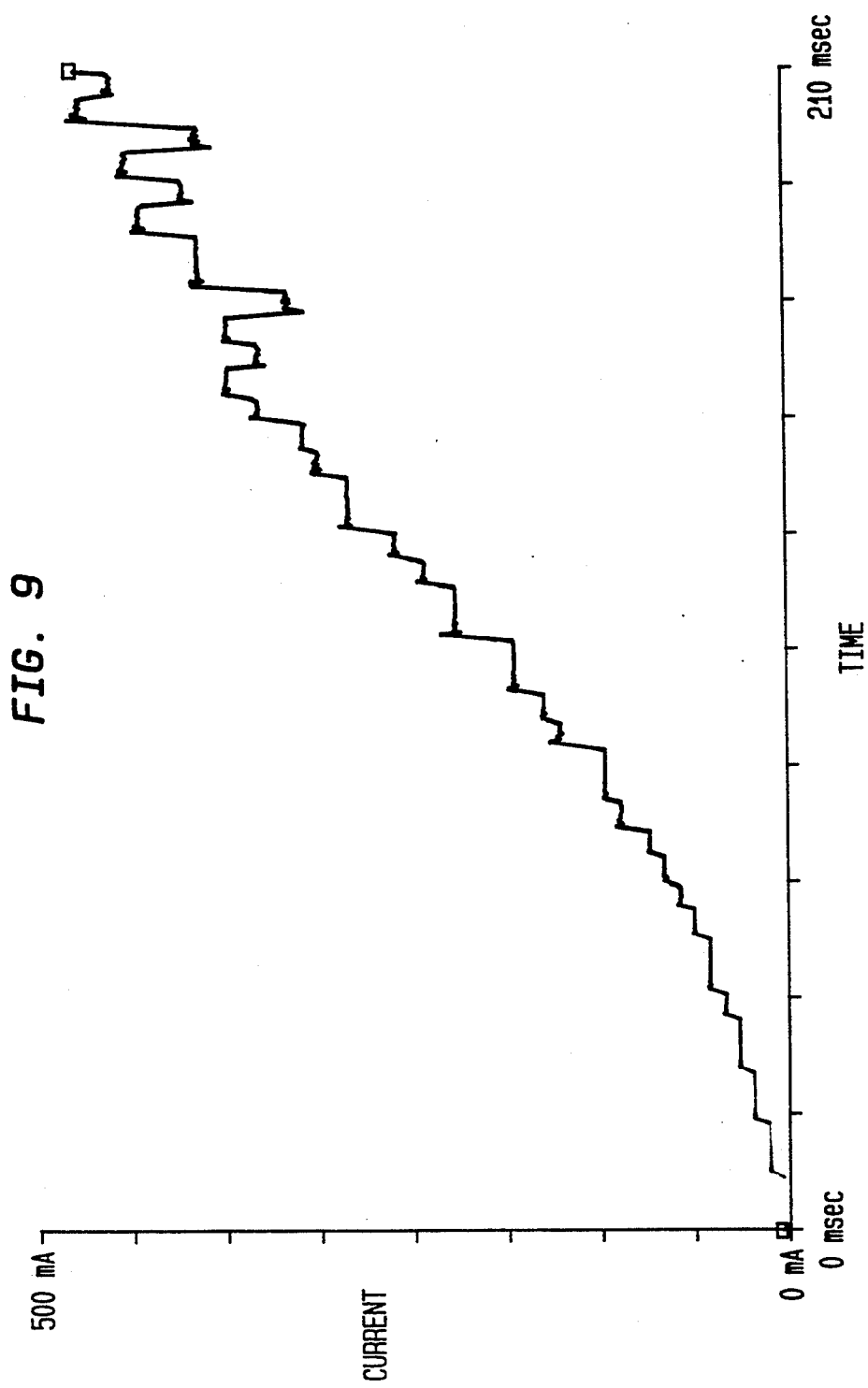
FIG. 9 is a plot of motor current vs. time for an actual control system for a larger period of time than illustrated in FIG. 8.
Figure 10:
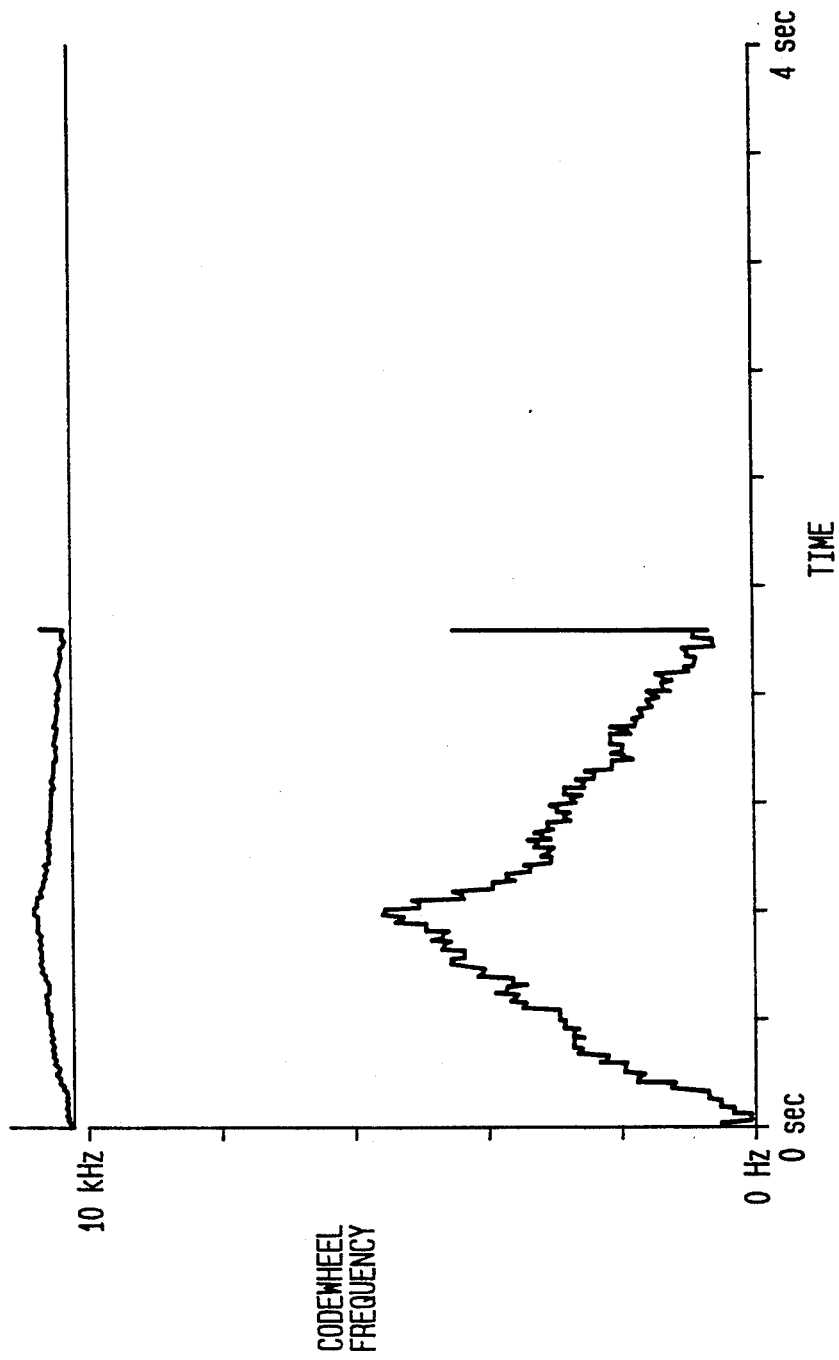
FIG. 10 is a plot of codewheel frequency vs. time for an actual threading operation.

FIGS. 8, 9 and 10 illustrate actual measurements taken on a control system 400 implemented according to the preferred embodiment described above. FIG. 8 is a plot showing measured motor current 432 in milliamps (ordinate) vs. time (abscissa) in milliseconds for an actual control system 400. As shown in FIG. 8, the current 432 supplied to motor 418 increases at a cubic rate during the extraction phase.

FIG. 9 illustrates measured motor current 432 vs. time of an actual control system 400 for a longer period of time than illustrated in FIG. 8. In FIG. 9, the current increases at a cubic rate until the breakover force is achieved (or until an extraction target value is reached). This occurs at approximately 150 milliseconds. After this time, current 432 increases approximately linearly as described above.

FIG. 10 is a plot of codewheel frequency vs. time for an actual control system 400. Codewheel frequency is the frequency of pulses generated by encoder 412. Codewheel frequency is proportional to the velocity of the shaft of motor 418.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for controlling an amount of force supplied by a motor to move an object form an at-rest position, comprising:
    a motor controller having an input configured to accept an actual position signal indicating an actual position of the object and an output configured to provide a motor control signal to control the amount of force (F) supplied by the motor; and
    a position sensor, coupled to said motor controller, configured to detect said actual position of the object being moved by the motor as a function of time (t) and to send said actual position signal to said motor controller;
    wherein said motor control signal supplied by said motor controller controls the motor such that the force (F) supplied by the motor on the object to move the object from its at-rest position at a rate that is proportional to $t^N$, where N is greater than 2.

2. The system of claim 1, wherein the force supplied by the motor to move the object from its at-rest position is proportional to $t^N$, where N is equal to 3.

3. The system of claim 2, wherein said motor controller comprises:
    a profile generator, configured to provide a position profile representing a desired position of said object, and to output a drive signal in response to said position profile; and
    a summer, coupled to said profile generator, configured to subtract said actual position of the object from said desired position to obtain an error signal, wherein said error signal represents a difference between said desired position and said actual position.

4. The system of claim 3, wherein said motor controller further comprises a compensator, coupled to an output of said summer, configured to receive said error signal and to generate said motor control signal in response thereto.

5. The system of claim 1, wherein said position sensor comprises:
    an encoder, or generating an encoder signal indicating the amount of rotation of a shaft of said motor; and
    a counter, coupled to said encoder, configured to calculate said actual position in response to said encoder signal and to output said actual position signal to said motor controller.

6. The system of claim 1, further comprising:
    a digital to analog converter, coupled to said motor controller, configured to convert said motor control signal from a digital to an analog control signal; and
    a motor drive, coupled to said digital to analog converter, configured to convert said analog control signal into a motor drive signal.

7. A magnetic tape drive, having a threading mechanism, the threading mechanism configured to thread a magnetic tape having a leader block along a transport path, comprising:
    a thread arm, configured to grasp the leader block and extract the leader block from a tape cartridge and to transport the leader block along the transport path;
    a thread motor, connected to said thread arm, configured to provide a force to said thread arm, wherein said force is used to extract said leader block;
    a motor controller, coupled to said thread motor, configured to provide a motor control signal to control said force supplied by said thread motor; and
    a position sensor, coupled to said motor controller, configured to detect an actual position of said thread arm along the transport path as a function of time (t) and to send said actual position signal to said motor controller;
    wherein said motor control signal supplied by said motor controller controls the motor, such that the force supplied by the motor to move the object from its at-rest position is proportional to $t^N$, where N is greater than 2.

8. The magnetic tape drive of claim 7, wherein the force supplied by the motor to move the object form its at-rest position is proportional to $t^N$, where N is equal to 3.

9. The system of claim 7, wherein said motor controller comprises:
    a profile generator, configured to provide a position profile, and to output a drive signal in response to said position profile, wherein said position profile represents a desired position of said thread arm as a function of time; and
    a summer, coupled to said profile generator, configured to subtract said actual position of said thread arm from said desired position to obtain an error signal, wherein said error signal represents a difference between said desired position and said actual position.

10. The system of claim 9, wherein said motor controller further comprises a compensator, coupled to an output of said summer, configured to receive said error signal and to generate said motor control signal in response thereto.

11. The system of claim 7, wherein said position sensor comprises:
    an encoder, for generating an encoder signal indicating the amount of rotation of a shaft of said motor; and
    a counter, coupled to said encoder, configured to calculate said actual position in response to said encoder signal and to output said actual position signal to said motor controller.

12. The system of claim 7, further comprising:
    a digital to analog converter, coupled to said motor controller, configured to convert said motor control signal form a digital to an analog control signal; and a motor drive, coupled to said digital to analog converter, configured to convert said analog control signal into a motor drive signal.

13. A method for controlling an amount of force supplied by a motor to move an object from an at-rest position, comprising the steps of:
(a) generating a position profile representing a desired position of the object as a function of time (t), wherein said position profile is proportional to $t^N$, where N is greater than 2.;
(b) subtracting an actual position of the object from said desired position to obtain a position error; and
(c) applying force to the object at a rate proportional to said position error until said force exceeds a breakover force required to move the object from the at-rest position.

14. The method of claim 13, further comprising the step of generating a motor control signal in response to said position error, wherein said motor control signal controls the amount of force supplied by the motor.

15. The method of claim 13, further comprising the steps of determining said actual position of the object.

16. The method of claim 13, further comprising the steps of:
(d) maintaining said position profile as a cubic profile until an extraction target value is reached, wherein said extraction target value is a predetermined value of said force known to exceed said breakover force; and
(e) varying an acceleration profile as a stepwise profile after said extraction target value is reached, thereby maintaining said position profile as a parabolic profile.

17. The method of claim 13, wherein said position profile is proportional to $t^N$, where N is equal to 3.

* * * * *